United States Patent
Jean et al.

(10) Patent No.: US 7,340,037 B1
(45) Date of Patent: Mar. 4, 2008

(54) PROCESSES AND SYSTEMS FOR CORRELATING WORK ORDERS

(75) Inventors: David R. Jean, Birmingham, AL (US); Judy M. Marcopulos, Duluth, GA (US); Rita H. Scherer, Birmingham, AL (US)

(73) Assignee: AT&T Intellectual Property, Inc., Wilmington, DE (US)

( * ) Notice: Subject to any disclaimer, the term of this patent is extended or adjusted under 35 U.S.C. 154(b) by 1297 days.

(21) Appl. No.: 09/946,272

(22) Filed: Sep. 4, 2001

(51) Int. Cl.
*H04M 1/24* (2006.01)
*H04M 3/08* (2006.01)
*H04M 3/22* (2006.01)

(52) U.S. Cl. .................. 379/9.02; 379/9.03; 379/9.04; 379/15.03

(58) Field of Classification Search .................... 379/9, 379/9.02, 9.03, 9.04, 15.03, 15.01, 26.01, 379/32.01; 707/3, 7; 718/100
See application file for complete search history.

(56) References Cited

U.S. PATENT DOCUMENTS

| | | |
|---|---|---|
| 4,464,543 A | 8/1984 | Kline et al. |
| 5,155,761 A | 10/1992 | Hammond ................... 379/67 |
| 5,285,494 A | 2/1994 | Sprecher et al. |
| 5,406,616 A | 4/1995 | Bjorndahl ..................... 379/59 |
| 5,689,550 A | 11/1997 | Garson et al. |
| 5,784,438 A | 7/1998 | Martinez ..................... 379/89 |
| 5,790,633 A | 8/1998 | Kinser et al. |
| 5,793,771 A | 8/1998 | Darland et al. ............. 370/467 |
| 5,893,906 A | 4/1999 | Daffin et al. |
| 5,920,846 A | 7/1999 | Storch et al. |
| 5,937,048 A | 8/1999 | Pelle |
| 5,946,372 A | 8/1999 | Jones et al. |
| 5,946,373 A | 8/1999 | Harris |
| 5,956,024 A | 9/1999 | Strickland et al. |
| 6,006,171 A | 12/1999 | Vines et al. |
| 6,018,567 A | 1/2000 | Dulman |
| 6,032,039 A | 2/2000 | Kaplan ....................... 455/413 |
| 6,173,047 B1 | 1/2001 | Malik ......................... 379/207 |
| 6,175,859 B1 | 1/2001 | Mohler ....................... 709/206 |

(Continued)

FOREIGN PATENT DOCUMENTS

WO     WO 02/45393 A2     6/2002

OTHER PUBLICATIONS

An Extensible Message Format for Message Disposition Notifications, R. Fajman, National Institutes of Health, Mar. 1998.

(Continued)

*Primary Examiner*—Quoc Tran
(74) *Attorney, Agent, or Firm*—Cantor Colburn LLP

(57) ABSTRACT

Methods and systems are disclosed for correlating work orders. One embodiment includes communicating with a communications network and acquiring new work order information representing a new work order. The new work order information is searched for at least one correlation parameter. A database of existing work orders is also searched for the at least one correlation parameter. The new work order information is grouped with existing work order information that shares the at least one correlation parameter and that has a date and time stamp within a predetermined interval of a date and time stamp of the new work order. The process, therefore, correlates the new work order with an existing work order having the at least one correlation parameter and a similar date and time stamp.

28 Claims, 7 Drawing Sheets

U.S. PATENT DOCUMENTS

| | | |
|---|---|---|
| 6,263,322 B1 | 7/2001 | Kirkevold et al. |
| 6,289,382 B1 | 9/2001 | Bowman-Amuah |
| 6,295,540 B1 | 9/2001 | Sanschargrin et al. |
| 6,353,902 B1 | 3/2002 | Kulatunge et al. |
| 6,353,928 B1 | 3/2002 | Rochkind |
| 6,356,928 B1 * | 3/2002 | Rochkind .................. 718/101 |
| 6,401,090 B1 | 6/2002 | Bailis et al. |
| 6,445,774 B1 | 9/2002 | Kidder et al. .............. 379/9.03 |
| 6,446,123 B1 | 9/2002 | Ballantine et al. |
| 6,493,694 B1 | 12/2002 | Xu et al. |
| 6,614,882 B1 | 9/2003 | Beamon et al. |
| 6,633,782 B1 | 10/2003 | Schleiss et al. |
| 6,636,486 B1 | 10/2003 | Magloughlin |
| 6,678,370 B1 | 1/2004 | Freebersyser et al. |
| 6,788,765 B1 | 9/2004 | Beamon |
| 6,845,148 B1 | 1/2005 | Beamon |
| 6,870,900 B1 | 3/2005 | Beamon |
| 6,937,993 B1 * | 8/2005 | Gabbita et al. ................ 705/8 |
| 6,961,315 B1 | 11/2005 | Doherty et al. |
| 6,961,415 B2 | 11/2005 | Doherty et al. |
| 2001/0029504 A1 | 10/2001 | O'Kane, Jr. et al. |
| 2002/0161731 A1 | 10/2002 | Tayebnejad et al. |
| 2002/0168054 A1 | 11/2002 | Klos et al. |
| 2003/0069797 A1 | 4/2003 | Harrison |
| 2003/0187752 A1 | 10/2003 | Kapianen et al. |
| 2004/0022379 A1 | 2/2004 | Klos et al. |
| 2004/0260668 A1 * | 12/2004 | Bradford ....................... 707/1 |
| 2006/0050862 A1 | 3/2006 | Shen et al. |

OTHER PUBLICATIONS

Impact Voice Mail Server Deluxe, Black Ice Software Inc., CTI Expo, Spring 1999.
BellSouth Memory Call VoiceMail Services, 1999.
Voice Profile for Internet Mail—Version 2, G. Vaudreuil—Lucent Technologies and G. Parsons—Northern Telecom, Sep. 1998.
IP Infrastructure: The Fastest Track for Tomorrow's Unified Communications, Arthur Rosenberg and David Zimmer, The Unified View, Oct. 2000.
TDB: Computerized Call Return Feature, IBM Technical Disclosure Bulletin, Apr. 1986.
An Extensible Message Format for Message Disposition Notification, R. Fajman, National Institutes of Health, Mar. 1998.
Voice Profile for Internet Mail—Version 2, G. Vandreuil—Lucent Technologies and G. Parsons—Northern Telecom, Sep. 1998.
US 6,826,262, 11/2004, Jean et al. (withdrawn)

* cited by examiner

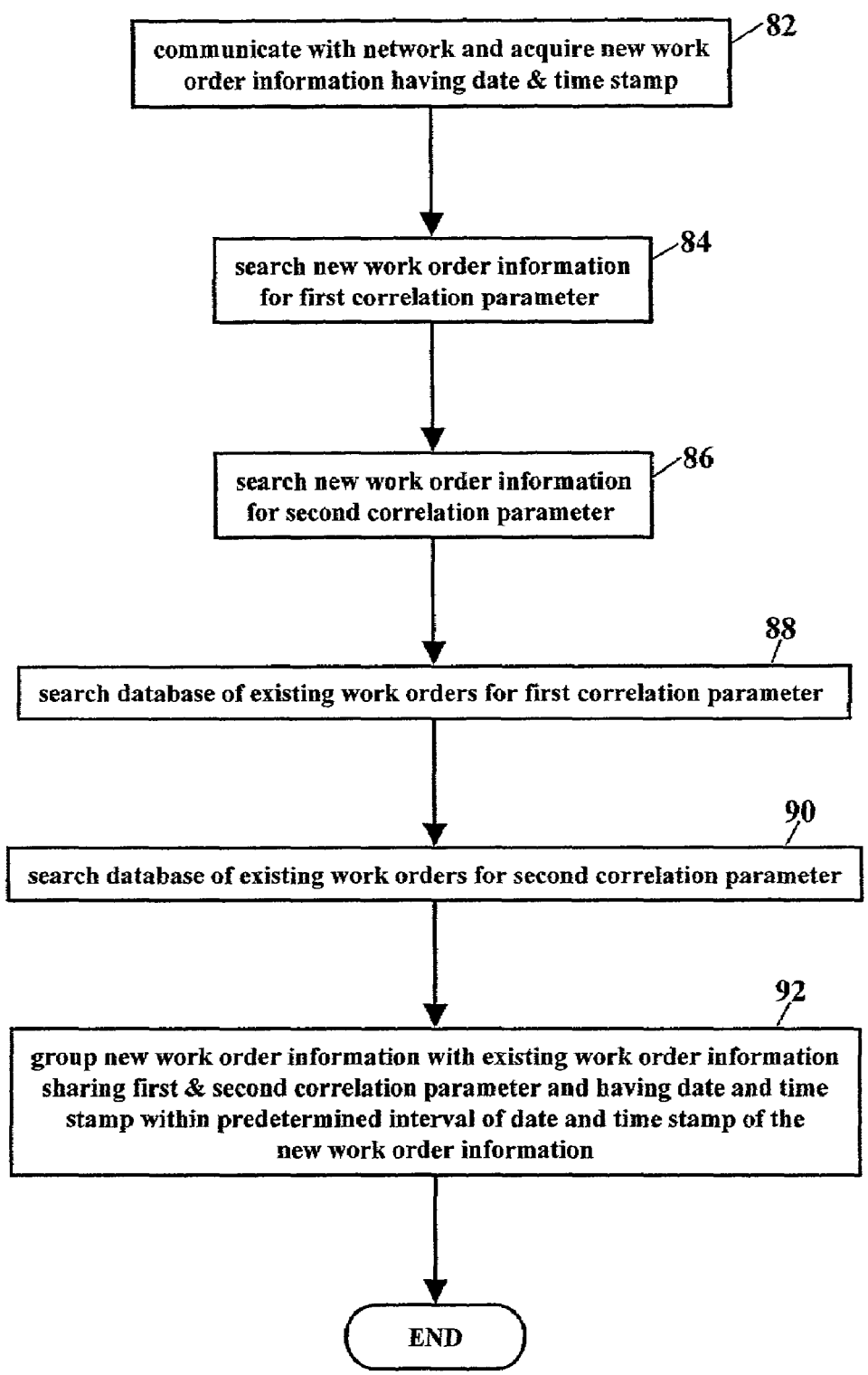

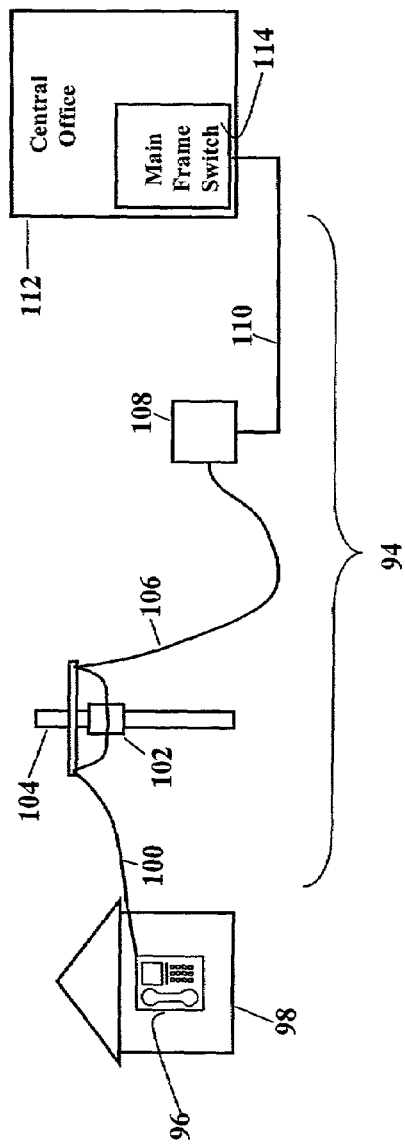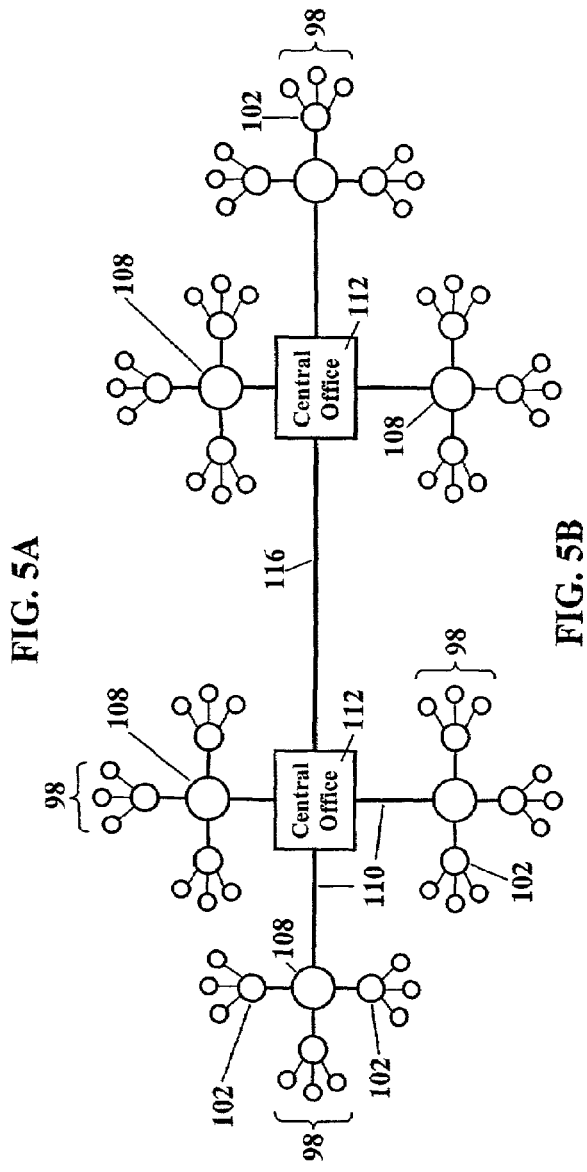
FIG. 5A
FIG. 5B

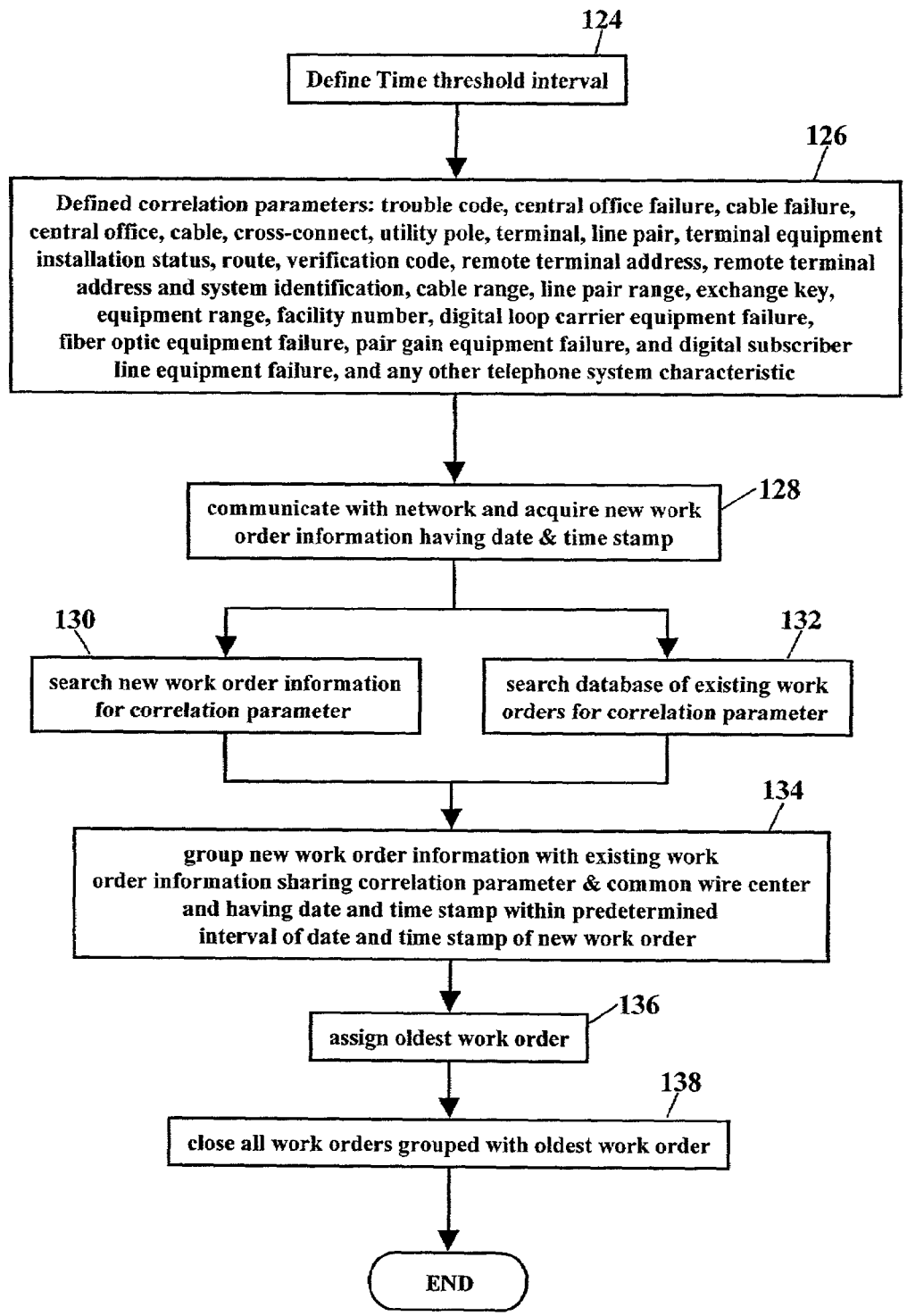

PROCESSES AND SYSTEMS FOR CORRELATING WORK ORDERS

NOTICE OF COPYRIGHT PROTECTION

A portion of the disclosure of this patent document and its figures contain material subject to copyright protection. The copyright owner has no objection to the facsimile reproduction by anyone of the patent document or the patent disclosure, but otherwise reserves all copyrights whatsoever.

BACKGROUND OF THE INVENTION

1. Field of the Invention

This invention generally relates to work order management systems and, more particularly, to processes and systems for correlating new work orders with existing work orders to improve efficiencies.

2. Description of the Related Art

Most residential and business telephone customers are connected to telephone systems by copper cables and wires. These copper cables are the familiar one or more telephone lines running throughout nearly every home in the United States. Because copper cable and wire connects each home, and many businesses, to the telephone system, the Public Switched Telephone Network is composed of billions of copper cables and wires. Each of these copper cables must be maintained to provide superior telephone service to the customer.

Yet maintaining these copper cables and wires is an extraordinary task. The Public Switched Telephone Network, with its millions of copper cables and wires, may receive hundreds of maintenance calls per day. These maintenance calls, in turn, may result in hundreds of maintenance work orders. A single cable fault, for example, may server telephone service to hundreds of customers. Construction crews can inadvertently severe telephone service to hundreds of customers. Storms, floods, and other natural disasters can interrupt telephone service and require thousands of man-hours of restoration. Even common, everyday exposure to ozone, summer heat, winter cold, and water can deteriorate and degrade copper cables and wires. These hundreds of daily maintenance calls, and the resultant work orders, must be efficiently managed to prevent maintenance costs from eroding profits.

Correlation is one persistent problem with efficient work order management. Managers often have no method of correlating work orders to efficiently utilize technician efforts, training, and equipment. A technician, for example, may be assigned work orders at opposite ends of a telephone system local loop, so the technician inefficiently spends more time traveling between assignments than resolving customer complaints. Once the technician arrives at the service site, the technician may discover that specialized equipment or training is required. The technician's efforts are wasted, and a more-appropriate technician must be assigned. If several customers report a common failure, such as a downed telephone cable, multiple technicians may inefficiently converge at the same location to repair the same cable. A lack of correlation when managing work orders fosters inefficiencies and needlessly increase costs.

There is, accordingly, a need in the art for work order management systems that correlate work orders, that efficiently utilize technician capabilities and equipment, that provide faster repair service to customers, and that reduce the costs of maintaining operations.

BRIEF SUMMARY OF THE INVENTION

The aforementioned problems are reduced by a Correlation Manager module. The Correlation Manager module comprises processes and systems that groups work orders having one or more similar characteristics. These similar characteristics could include the same or similar trouble description, the same or similar maintenance location, the same or similar equipment, or any other characteristic the user desires. One technician, for example, may now be assigned multiple works orders that all describe maintenance tasks at a single location. The present invention, therefore, may assign a single technician to receive multiple, related work orders.

The present invention improves the efficiency of work order management. Where previously one technician could be assigned to each work order, the present invention correlates work orders according to any parameter a manager desires. The present invention efficiently groups works orders that share a common characteristic. A single technician can now receive and close related work orders. If, for example, multiple households call to report a broken water main, no longer will multiple repair crews converge on the same water main. If several telephone customers report faulty phone service, no longer will multiple repair trucks respond to repair a single telephone cable. The present invention, instead, correlates work orders according to related characteristics, such as a common water main location or a common telephone cable. A single repair crew, or a single technician, is then assigned and dispatched to repair the common problem. The efficiency gains offered by the present invention allow more maintenance tasks to be performed per day and, thus, increase the number of satisfied customers.

The present invention also reduces repair costs. Because the present invention efficiently assigns maintenance tasks, the present invention reduces non-value added efforts. Where several crews were previously assigned to a common problem, one crew, or one technician, now responds to the common problem. Labor costs, and the associated fuel costs, are no longer wasted on needless work order assignments. Maintenance forces may now complete and close more work orders without rolling more trucks and technicians. The present invention is thus a tool to achieve significant cost reductions and, yet, improvements in service and in quality.

BRIEF DESCRIPTION OF THE SEVERAL VIEWS OF THE DRAWINGS

These and other features, aspects, and advantages of the present invention are better understood when the following Detailed Description of the Invention is read with reference to the accompanying drawings, wherein:

FIG. 4 is a flowchart describing a process of correlating a new work order with existing work orders;

FIGS. 5A and 5B are diagrams illustrating a local loop of the Public Switched Telephone Network;

FIG. 7 is a flowchart describing a process of correlating a new work order with existing work orders.

DETAILED DESCRIPTION OF THE INVENTION

Figure 1:
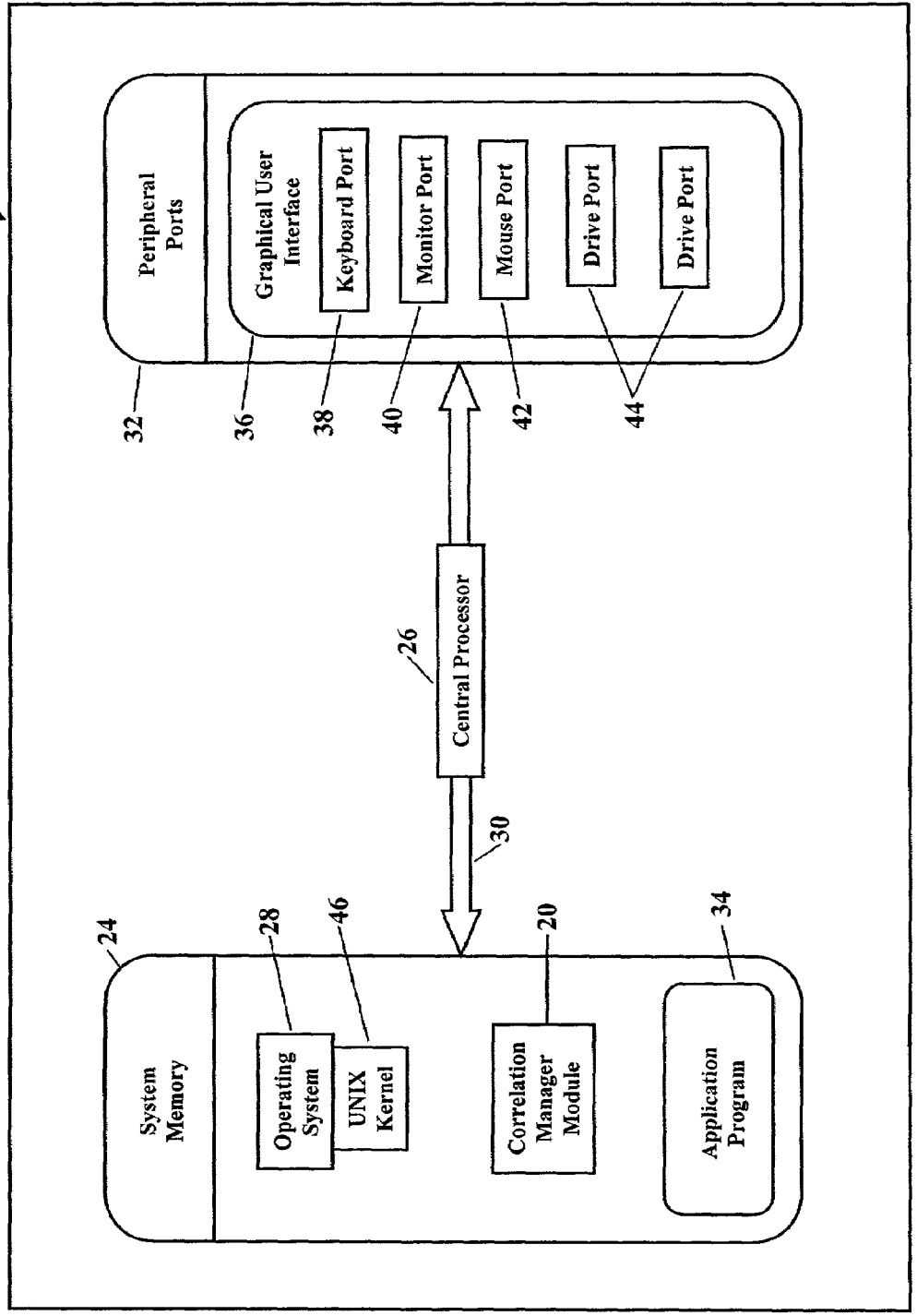
FIG. 1 is a block diagram showing the Correlation Manager module residing in a computer system.

The present invention particularly relates to processes and systems for correlating a new work order with existing work orders. A "work order," as used herein, is information describing a maintenance task to be performed. One embodiment communicates with a communications network and acquires new work order information. The new work order information represents the new work order, and the new work order information includes a date and time stamp. The new work order information is searched for a first correlation parameter and a second correlation parameter. A database of existing work orders is also searched for the first correlation parameter and the second correlation parameter. The new work order information is then grouped with existing work order information that shares the first correlation parameter, that shares the second correlation parameter, and that has a date and time stamp within a predetermined interval of the date and time stamp of the new work order. The process correlates the new work order with an existing work order having the same first correlation parameter, the same second correlation parameter, and similar date and time stamps.

An alternative embodiment describes a process of correlating a new work order with existing work orders. This alternative embodiment communicates with a communications network and inquires if the new work order contains a first correlation parameter and a second correlation parameter. The alternative embodiment also communicates with the communications network and inquires whether any existing work orders also contain the first correlation parameter and the second correlation parameter. The process then requests that the new work order be grouped with an existing work order that shares the first correlation parameter, that shares the second correlation parameter, and that has a date and time stamp within a predetermined interval of a date and time stamp of the new work order, whereby the process correlates the new work order with an existing work order having the same first correlation parameter, the same second correlation parameter, and similar date and time stamps.

Another embodiment describes a process of correlating a new work order with existing work orders. Here the process communicates with a communications network and acquires new work order information. The new work order information represents the new work order, and the new work order information includes a date and time stamp. The new work order information is searched for at least one correlation parameter. A database of existing work orders is also searched for the at least one correlation parameter. The new work order information is grouped with existing work order information that shares the at least one correlation parameter, that shares a common designation of a telephone system wire center, and that has a date and time stamp within a predetermined interval of the date and time stamp of the new work order. The process correlates the new work order with an existing work order having the at least one correlation parameter, the same wire center, and similar date and time stamps.

Another aspect discloses a process of correlating a new work order with existing work orders. This aspect communicates with a communications network and inquires whether the new work order contains at least one correlation parameter and whether existing work orders also contain the at least one correlation parameter. The process requests that the new work order be grouped with an existing work order that shares the at least one correlation parameter, that shares a common designation of a telephone system wire center, and that has a date and time stamp within a predetermined interval of a date and time stamp of the new work order, whereby the process correlates the new work order with an existing work order having the at least one correlation parameter, the same wire center, and similar date and time stamps.

Still a further aspect describes a system for correlating work orders. The system has a Correlation Manager module and a processor. The Correlation Manager module correlates new work order information with existing work order information. The Correlation Manager groups the new work order information with existing work order information that shares at least one correlation parameter, that shares a common designation of a telephone system wire center, and that has a date and time stamp within a predetermined interval of a date and time stamp of the new work order information. The processor is capable of processing the new work order information, is capable of processing the existing work order information, and is capable of grouping the new work order information with the existing work order information.

Another embodiment describes a computer program product for correlating work orders. The computer program product has a Correlation Manager module stored on a computer-readable medium. The Correlation Manager module correlates new work order information with existing work order information. The Correlation Manager groups the new work order information with existing work order information that shares at least one correlation parameter, that shares a common designation of a telephone system wire center, and that has a date and time stamp within a predetermined interval of a date and time stamp of the new work order information.

Figure 2:
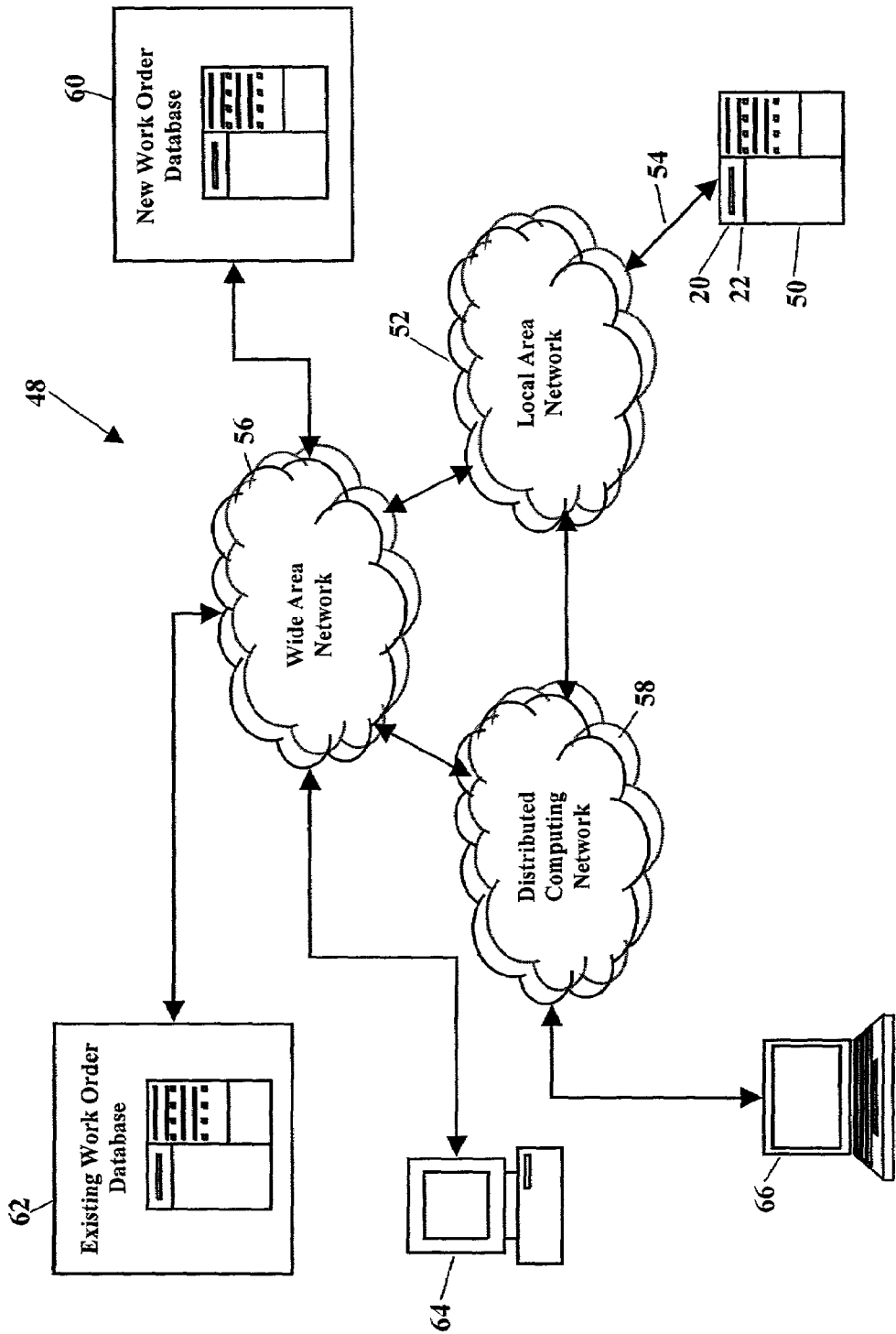
FIG. 2 is a block diagram of a communications network representing an alternative operating environment.

FIGS. 1 and 2 depict a possible operating environment for an embodiment of the present invention. This embodiment of a Correlation Manager module 20 comprises a computer program that correlates and groups work order information. As those of ordinary skill in the art of computer programming recognize, computer processes/programs are depicted as process and symbolic representations of computer operations. Computer components, such as a central processor, memory devices, and display devices, execute these computer operations. The computer operations include manipulation of data bits by the central processor, and the memory devices maintain the data bits in data structures. The process and symbolic representations are understood, by those skilled in the art of computer programming, to convey the discoveries in the art.

FIG. 1 is a block diagram showing the Correlation Manager module 20 residing in a computer system 22. The Correlation Manager module 20 operates within a system memory device 24. The computer system 22 also has a central processor 26 executing an operating system 28. The operating system 28, as is well known, has a set of instructions that control the internal functions of the computer system 22. A system bus 30 communicates signals, such as data signals, control signals, and address signals, between the central processor 26, the system memory device 24, and at least one peripheral port 32. Those of ordinary skill in the art understand that the program, processes, methods, and systems described in this patent are not limited to any particular computer system or computer hardware.

Those of ordinary skill in art also understand the central processor 26 is typically a microprocessor. Advanced Micro Devices, Inc., for example, manufactures a full line of ATHLON™ microprocessors (ATHLON™ is a trademark of Advanced Micro Devices, Inc., One AMD Place, P.O. Box 3453, Sunnyvale, Calif. 94088-3453, 408.732.2400, 800.538.8450). The Intel Corporation also manufactures a family of X86 and P86 microprocessors (Intel Corporation, 2200 Mission College Blvd. Santa Clara, Calif. 95052-8119, 408.765.8080). Other manufactures also offer microprocessors. Such other manufactures include Motorola, Inc. (1303 East Algonquin Road, P.O. Box A3309 Schaumburg, Ill. 60196,), International Business Machines Corp. (New Orchard Road, Armonk, N.Y. 10504, (914) 499-1900), and Transmeta Corp. (3940 Freedom Circle, Santa Clara, Calif. 95054). While only one microprocessor is shown, those skilled in the art also recognize multiple processors may be utilized. Those skilled in the art further understand that the program, processes, methods, and systems described in this patent are not limited to any particular manufacture's central processor.

The preferred operating system 28 is the UNIX® operating system (UNIX® is a registered trademark of the Open Source Group). Those skilled in the art also recognize many other operating systems are suitable. Other suitable operating systems include UNIX-based LINUX, WINDOWS NT® (WINDOWS NT® is a registered trademark of Microsoft Corporation, One Microsoft Way, Redmond Wash. 98052-6399, 425.882.8080), and Mac® OS (Mac® is a registered trademark of Apple Computer, Inc., 1 Infinite Loop, Cupertino, Calif. 95014, 408.996.1010). Those of ordinary skill in the art again understand that the program, processes, methods, and systems described in this patent are not limited to any particular operating system.

The system memory 24 may also contain an application program 34. The application program 34 cooperates with the operating system 28 and with the at least one peripheral port 32 to provide a Graphical User Interface (GUI) 36. The Graphical User Interface 36 is typically a combination of signals communicated along a keyboard port 38, a monitor port 40, a mouse port 42, and one or more drive ports 44. As those of ordinary skill well understand, a kernel portion 46 of the preferred UNIX® operating system 28 manages the interface between the application program 34, the input/output devices (the keyboard port 38, the monitor port 40, the mouse port 42, or the drive ports 44), the system memory 24, and the scheduling and maintenance of the file access system 20.

FIG. 2 is a block diagram of a communications network 48. This communications network 48 further represents an operating environment for the Correlation Manager module 20. The Correlation Manager module 20 resides within the memory storage device (shown as reference numeral 24 in FIG. 1) in the computer system 22. The computer system 22 is conveniently shown as a computer server 50, however, the Correlation Manager module 20 may reside in any computer system. The computer server 50 communicates with a Local Area Network (LAN) 52 along one or more data communication lines 54. As those of ordinary skill in the art understand, the Local Area Network 52 is a grid of communication lines through which information is shared between multiple nodes. These multiple nodes are conventionally described as network computers. As those of ordinary skill in the art also recognize, the Local Area Network 52 may itself communicate with a Wide Area Network (WAN) 56 and with a globally-distributed computing network 58 (e.g. the "Internet"). The communications network 48 allows the Correlation Manager module 20 to request and acquire information from many computers connected to the Local Area Network 52, the Wide Area Network 56, and the globally-distributed computing network 58.

As FIG. 2 shows, the Correlation Manager module 20 sends and receives information to/from many other computers connected to the communications network 48. The Correlation Manager module 20, for example, may acquire new work order information from a server maintaining a new work order database 60. The Correlation Manager module 20 may also acquire existing work order information from a server maintaining an existing work order database 62. The Correlation Manager module 20 may communicate this acquired information over the communications network 48 to a user at a user computer 64. FIG. 2 even shows that remote users, such as programmers and engineers, may use a portable computer 66 to access the communications network 48 and remotely access the Correlation Manager module 20. Because many computers may be connected to the communications network 48, computers and computer users may share and communicate a vast amount of information.

Figure 3:
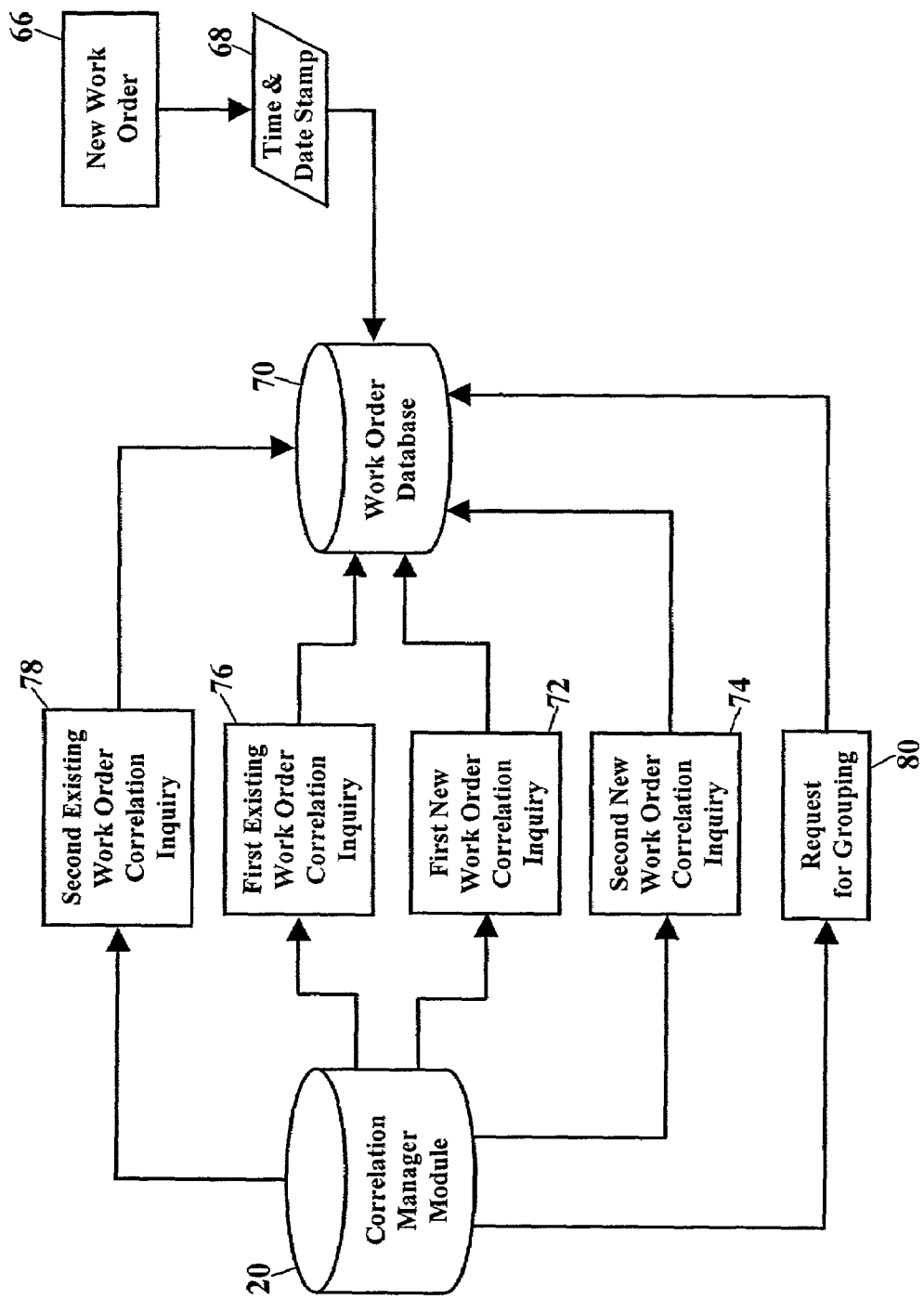
FIG. 3 is a block diagram showing one embodiment of the Correlation Manager module.

FIG. 3 is a block diagram showing one embodiment of the Correlation Manager module 20. The Correlation Manager module 20, in this embodiment, is a computer program that acquires information from the communications network (shown as reference numeral 48 in FIG. 2) and uses this information to correlate and group both open and closed work orders. As FIG. 3 illustrates, a new work order 66, including a date and time stamp 68, is communicated over the communications network to a work order database 70. The work order database 70 stores the new work order 66 with previously-created, existing work orders.

The Correlation Manager module 20 then requests searches. The Correlation Manager module 20 correlates the new work order 66 with existing work orders according to at least one correlation parameter. The Correlation Manager module 20 communicates with the communications network and inquires whether the new work order 66 contains the at least one correlation parameter. A first new work order correlation inquiry 72, for example, inquires whether the new work order 66 contains a first predetermined correlation parameter. A second new work order correlation inquiry 74 inquires whether the new work order 66 contains a second predetermined correlation parameter. If the new work order 66 contains the at least one correlation parameter, then the Correlation Manager module 20 requests a search of existing work orders that also contain the at least one correlation parameter. A first existing work order correlation inquiry 76, and a second existing work order correlation inquiry 78, inquires whether any existing work orders also contain the first and second correlation parameters. While only the first correlation parameter and the second correlation parameter are discussed, those of ordinary skill in the art now recognize more than two correlation parameters may be chosen.

Once work orders are searched, the Correlation Manager module 20 requests groupings of work orders. If an existing work order contains both the first and second correlation parameters, the Correlation Manager module 20 then communicates a request for grouping 80. The Correlation Manager module 20 requests that the new order 66 be grouped with any existing work orders that share the first and second correlation parameters. The Correlation Manager module 20 may even further request that the new order 66 be grouped with any existing work orders that share date and time stamps. The Correlation Manager module 20 may alternatively request groupings of work orders that have date and time stamps within a predetermined interval.

FIG. 4 is a flowchart describing a process of correlating a new work order with existing work orders. The flowchart describes communicating with a communications network and acquiring new work order information (Block 82). The new work order information represents the new work order and may include a date and time stamp. The new work order information is searched for a first correlation parameter (Block 84) and a second correlation parameter (Block 86). A database of existing work orders is searched for the first correlation parameter (Block 88) and the second correlation parameter (Block 90). The new work order information is then grouped with existing work order information that shares the first correlation parameter, that shares the second correlation parameter, and that has a date and time stamp within a predetermined interval of the date and time stamp of the new work order (Block 92). The process, therefore, correlates the new work order with an existing work order having the same first correlation parameter, the same second correlation parameter, and similar date and time stamps.

Work orders may be correlated by any common characteristics. The new work order may be grouped with existing work orders that share a common manager, a common supervisor, or a common technician. The new work order may be grouped with existing work orders that describe common maintenance to be performed, common equipment or machines that need repair, or even maintenance that requires a common tool or common equipment. Work orders could also be grouped according to a common process or a common plant. The at least one correlation parameter could describe a common region, time zone, state, area, or district. Work orders may be grouped according to any parameters users or managers desire to help achieve efficiency gains and reduce costs.

As those of ordinary skill may recognize, the Correlation Manager module (shown as reference numeral 20 in FIGS. 1-3) may help many different industries, systems, and processes manage work orders. The Correlation Manager module, in fact, is especially applicable to the Public Switched Telephone Network. The Public Switched Telephone Network (PSTN) is composed of many switches and thousands of copper cables, copper wires, and fiber optic cables. The Public Switched Telephone Network, therefore, may receive hundreds of maintenance cells per day. The Correlation Manager module helps manage work orders so that customer complaints and repair costs are less likely to erode profits.

FIGS. 5A and 5B illustrate the need for correlated maintenance of the Public Switched Telephone Network. FIG. 5A is a diagram illustrating a local loop 94 of the Public Switched Telephone Network. The local loop 94 is the physical infrastructure that routes telephone calls between customers. A residential telephone customer, for example, places a call using terminal equipment 96 located inside a house 98. While FIG. 5A shows the terminal equipment 96 as a common telephone, the terminal equipment 96 could alternatively be a facsimile machine, personal computer modem, or other similar equipment. The terminal equipment 96 converts sound into electrical signals. The electrical signals travel along a copper line pair 100 to a small cross-connect 102. The small cross-connect 102 is shown located atop a utility pole 104, but the small cross-connect 102 could be located at ground level in newer installations. A distribution cable 106 carries the electrical signals from the small cross-connect 102 to a large cross-connect 108. A feeder cable 110 carries the electrical signals to a central office 112. Inside the central office 112 is a main frame switch 114. The main frame switch 114 routes the electrical signals to the proper destination. See RICHARD A. THOMPSON, TELEPHONE SWITCHING SYSTEMS 71-72 (2000).

FIG. 5B shows the central office 112 may serve multiple local loops. While FIG. 5A shows only one (1) feeder cable 110, FIG. 5B shows that the central office 112 may serve multiple feeder cables. Each feeder cable 110 may carry thousands of copper line pairs to each respective large cross-connect 108. Each feeder cable 110, therefore, serves a different part of the community. Each large cross-connect 108, in turn, may serve as a distribution point for many small cross-connects 102. Each small cross-connect 102, in turn, serves many residential households 98. There may, in turn, be multiple central offices, with each central office 112 connected by a trunk line 116. See THOMPSON, supra, at 71. The complexity of the Public Switched Telephone Network is further magnified knowing there are approximately forty thousand (40,000) central offices located throughout the United States. See THOMPSON, supra, at 95. Such a complex system, with thousands of copper line pairs and fiber optic cables, requires a correlated work order management system of ensure profitable, quality telephone service.

Figure 6:
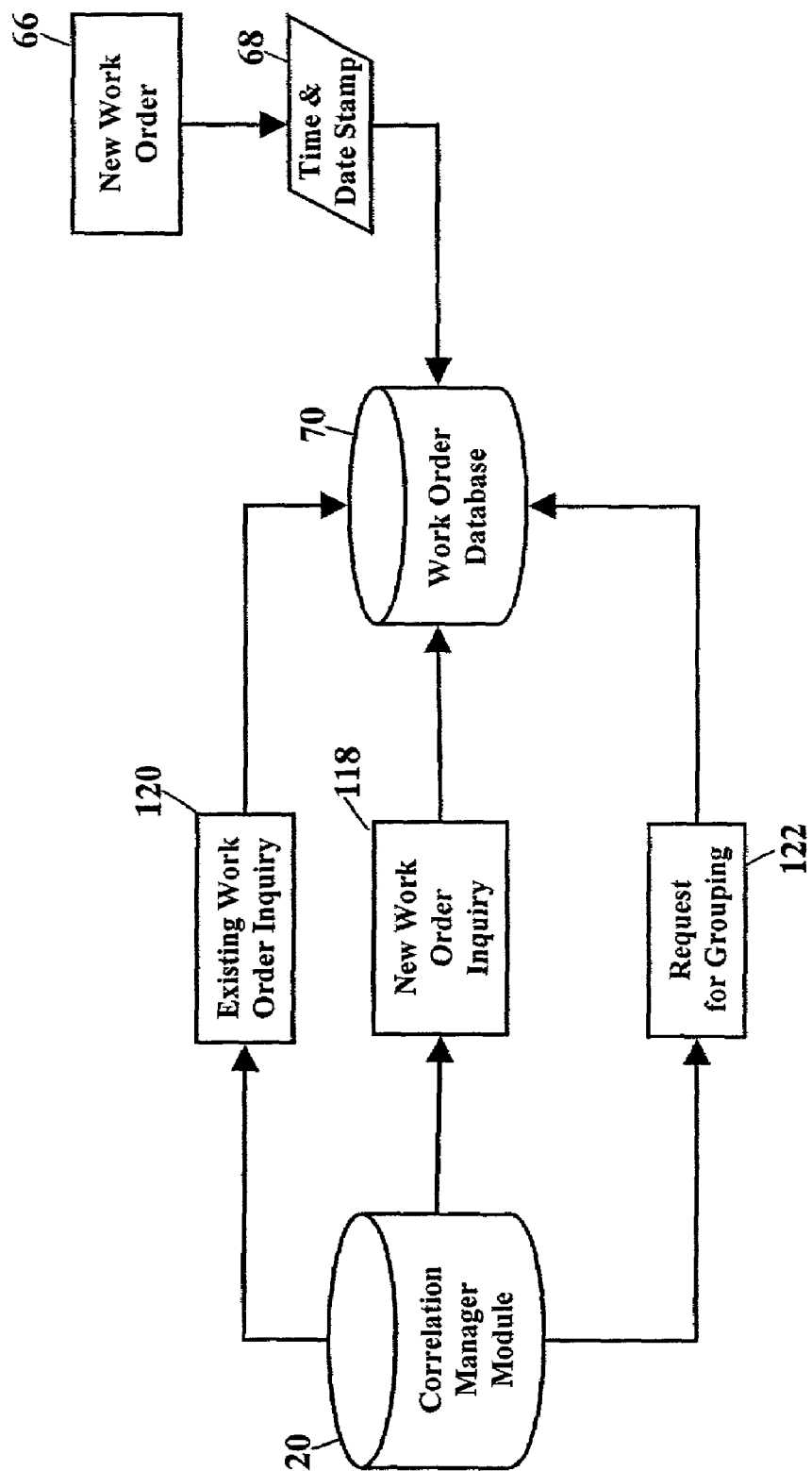
FIG. 6 is a schematic drawing showing an alternative embodiment configured for correlating a new work order with existing work orders.

The Correlation Manager module, therefore, is very useful for maintaining the Public Switched Telephone Network. FIG. 6 is a schematic drawing showing an alternative embodiment configured for correlating a new work order with existing work orders. Here the Correlation Manager module 20 groups new and existing work orders by the at least one correlation parameter and by a telephone system wire center. As those of ordinary skill in the art of telephony understand, the term "telephone system wire center" denotes a geographic area served by one or more main frame switches in a central office (shown as reference numerals 114 and 112, respectively, in FIG. 5A). This embodiment, therefore, correlates work orders having the same, or similar, wire center and having the same, or similar, at least one correlation parameter. As FIG. 6 shows, the new work order 66, including the date and time stamp 68, is communicated over the communications network to the work order database 70. The work order database 70 stores the new work order 66 with previously-created, existing work orders.

The Correlation Manager module 20 then requests correlation by the telephone system wire center. The Correlation Manager module 20 sends a new work order inquiry 118. The new work order inquiry 118 inquires whether the new work order 66 contains the at least one correlation parameter. The Correlation Manager module 20 also sends an existing work order inquiry 120. The existing work order inquiry 120 inquires whether any existing work orders contain the at least one correlation parameter. If one or more existing work orders also contain the at least one correlation parameter, the Correlation Manager module 20 sends a request for grouping 122. The request for grouping 122 requests that the new work order 66 be grouped with an existing work order that shares the at least one correlation parameter, that shares a common designation of a telephone system wire center, and that has a date and time stamp within a predetermined interval of a date and time stamp of the new work order. This embodiment, therefore, correlates the new work order 66 with an existing work order having the at least one correlation parameter, the same wire center, and similar date and time stamps.

Correlation by wire center is one geographic characteristic. The Correlation Manager module 20 could establish "turfs" to help correlate work orders. A turf would be a wire center or even a collection of wire centers. Whatever the designation of a turf, the turf would be a unique identifier or name. The concept of turfs could include various "levels," such region, state, area, district, general manager, manager, and wire center. The wire center could be a common component across all levels of turfs. Turfs could also overlap across wire centers. The concept of turfs could also provide relationships between wire center, class of service, and network management number.

The Correlation Manager module 20 also correlates by the at least one correlation parameter. The at least one correlation parameter describes any telephone system characteristic useful for further correlating and grouping telephone system work orders. The request for grouping 122, for example, may request that the new work order 66 be grouped with an existing work order that shares a common telephone system trouble code, a common telephone system central office failure, or a common telephone system cable failure. Work orders could be grouped according to a common designation of a telephone system central office facility, a common designation of a telephone system cable, a common designation of a telephone system cross-connect, a common designation of a utility pole, a common designation of a telephone system terminal, a common designation of a telephone system line pair, and a common designation of telephone system terminal equipment. The request for grouping 122 could also request that the new work order 66 be grouped with an existing work order that shares a common telephone system installation status, a common telephone system route, a common telephone system verification code, a common telephone system remote terminal address, a common telephone system remote terminal address and system identification, a common telephone system cable range, and a common telephone system line pair range. The at least one correlation parameter may also describe a common telephone system exchange key, a common telephone system office equipment range, and a common telephone system facility number. Work orders could also be grouped according to a common digital loop carrier equipment failure, a common fiber optic equipment failure, a common pair gain equipment failure, and a common digital subscriber line equipment failure. The at least one correlation parameter may, in short, be any characteristic of the telephone system that helps correlate and group work orders to reduce costs and improve profitability.

FIG. 7 is a flowchart describing a process of correlating a new work order with existing work orders. A time threshold interval is defined (Block 124). One or more correlation parameters are also defined (Block 126). New work order information is acquired over a communications network (Block 128). The new work order information represents the new work order having a date and time stamp. The new work order information is searched for at least one correlation parameter (Block 130). A database of existing work orders is also searched for the at least one correlation parameter (Block 132). If one or more existing work orders contain the at least one correlation parameter, then the new work order information is grouped with existing work order information that shares the at least one correlation parameter, that shares a common designation of a telephone system wire center, and that has a date and time stamp within a predetermined interval of a date and time stamp of the new work order (Block 134). The oldest work order within the interval may then be assigned to a technician (Block 136). When the technician performs the repair and closes the oldest work order, all work orders grouped with the oldest work order are also closed (Block 138). The process, therefore, correlates the new work order with an existing work order having the at least one correlation parameter, the same wire center, and similar date and time stamps.

The at least one correlation parameter may be any telephone system characteristic. The new work order information may be grouped with existing work order information that shares a common telephone system trouble code, a common telephone system central office failure, and a common telephone system cable failure. The at least one correlation parameter may include a common designation of a telephone system central office facility, a common designation of a telephone system cable, a common designation of a telephone system cross-connect, a common designation of a utility pole, a common designation of a telephone system terminal, a common designation of a telephone system line pair, and a common designation of telephone system terminal equipment. Work orders may be grouped according to a common telephone system installation status, a common telephone system route, a common telephone system verification code, a common telephone system remote terminal address, a common telephone system remote terminal address and system identification, a common telephone system cable range, and a common telephone system line pair range. The at least one correlation parameter could also include a common telephone system exchange key, a common telephone system office equipment range, and a common telephone system facility number. The new work order information could also be grouped with existing work order information that shares a common digital loop carrier equipment failure, a common fiber optic equipment failure, a common pair gain equipment failure, and a common digital subscriber line equipment failure.

The time threshold interval may also be user defined. The time threshold interval may be globally-defined or locally-defined. Managers, for example, may locally determine their desired time threshold interval based upon how the manager wants the technicians to be dispatched. Some managers may want correlation every four (4) hours, while other managers may want correlation every eight (8) hours. Some managers, alternatively, may want a certain cable count and pair count within a certain period of time. The time threshold interval may be defined according to global initiatives or according to local initiatives.

The Correlation Manager module (shown as reference numeral 20 in FIGS. 1-3 and 6) may be physically embodied on or in a computer-readable medium. The computer-readable medium includes CD-ROM, DVD, tape, cassette, floppy disk, memory card, and a large-capacity disk (such as IOMEGA® ZIP®, JAZZ®, and other large-capacity memory products) (IOMEGA®, ZIP®, and JAZZ® are registered trademarks of Iomega Corporation, 1821 W. Iomega Way, Roy, Utah 84067, 801.332.1000). This computer-readable medium, or media, could be distributed to end-users, licensees, and assignees. These types of computer readable media, and other types not mentioned here but considered within the scope of the present invention, allow the Correlation Manager module to be easily disseminated. A computer program product for correlating work orders has the Correlation Manager module stored on a computer-readable medium. The Correlation Manager module correlates new work order information with existing work order information. The Correlation Manager groups the new work order information with existing work order information that shares at least one correlation parameter, that shares a common designation of a telephone system wire center, and that has a date and time stamp within a predetermined interval of a date and time stamp of the new work order information.

While the present invention has been described with respect to various features, aspects, and embodiments, those skilled and unskilled in the art will recognize the invention is not so limited. Other variations, modifications, and alternative embodiments may be made without departing from the spirit and scope of the present invention.

What is claimed is:

1. A process of correlating a new work order with existing work orders, the process comprising the steps of:
    a) communicating with a communications network and acquiring new work order information, the new work order information representing the new work order, the new work order information having a date and time stamp;
    b) searching the new work order information for a first correlation parameter and a second correlation parameter;
    c) searching a database of existing work orders for the first correlation parameter and the second correlation parameter; and
    d) grouping the new work order information with existing work order information that shares the first correlation parameter, that shares the second correlation parameter, and that has a date and time stamp within a predetermined interval of the date and time stamp of the new work order information,
    e) assigning the grouped new work order and existing work order to a single technician;
    whereby the process correlates the new work order with an existing work order having the same first correlation parameter, the same second correlation parameter, and similar date and time stamps.

2. A process of correlating a new work order according to claim 1, wherein the step of grouping the new work order information comprises grouping the new work order information with existing work order information that shares at least one of a common designation of a region, a common designation of a time zone, a common designation of a state, a common designation of an area, and a common designation of a district.

3. A process of correlating a new work order according to claim 1, wherein the step of grouping the new work order information comprises grouping the new work order information with existing work order information that shares at least one of a common designation of a manager, a common designation of a supervisor, and a common designation of a technician.

4. A process of correlating a new work order according to claim 1, wherein the step of grouping the new work order information comprises grouping the new work order information with existing work order information that shares at least one of a common description of maintenance to be performed, a common designation of a location of maintenance to be performed, a common designation of equipment, a common designation of a machine, a common designation of a plant, a common designation of a process, and a common designation of a tool.

5. A process of correlating a new work order with existing work orders, the process comprising the steps of:
    a) communicating with a communications network and inquiring if the new work order contains a first correlation parameter and a second correlation parameter;
    b) communicating with the communications network and inquiring whether existing work orders contain the first correlation parameter and the second correlation parameter; and
    c) communicating with the communications network and requesting that the new work order be grouped with an existing work order that shares the first correlation parameter, that shares the second correlation parameter, and that has a date and time stamp within a predetermined interval of a date and time stamp of the new work order,
    assigning the grouped new work order and existing work order to a single technician;
    whereby the process correlates the new work order with an existing work order having the same first correlation parameter, the same second correlation parameter, and similar date and time stamps.

6. A process of correlating a new work order according to claim 5, wherein the step of communicating with the communications network and requesting that the new work order be grouped with an existing work order comprises requesting that the new work order be grouped with an existing work that shares at least one of a common designation of a region, a common designation of a time zone, a common designation of a state, a common designation of an area, and a common designation of a district.

7. A process of correlating a new work order according to claim 5, wherein the step of communicating with the communications network and requesting that the new work order be grouped with an existing work order comprises requesting that the new work order be grouped with an existing work that shares at least one of a common designation of a manager, a common designation of a supervisor, and a common designation of a technician.

8. A process of correlating a new work order according to claim 5, wherein the step of communicating with the communications network and requesting that the new work order be grouped with an existing work order comprises requesting that the new work order be grouped with an existing work that shares at least one of a common description of maintenance to be performed, a common designation of a location of maintenance to be performed, a common designation of equipment, a common designation of a machine, a common designation of a process, and a common designation of a tool.

9. A process of correlating a new work order with existing work orders, the process comprising the steps of:
    a) communicating with a communications network and acquiring new work order information, the new work order information representing the new work order, the new work order information having a date and time stamp;
    b) searching the new work order information for at least one correlation parameter;
    c) searching a database of existing work orders for the at least one correlation parameter;
    d) grouping the new work order information with existing work order information that shares the at least one correlation parameter, that shares a common designation of a telephone system wire center, and that has a date and time stamp within a predetermined interval of the date and time stamp of the new work order,
    e) assigning the grouped new work order and existing work order to a single technician;
    whereby the process correlates the new work order with an existing work order having the at least one correlation parameter, the same wire center, and similar date and time stamps.

10. A process correlating a new work order according to claim 9, wherein the step of grouping the new work order information comprises grouping the new work order information with existing work order information that shares at least one of a common telephone system trouble code; a common telephone system central office failure, and a common telephone system cable failure.

11. A process of correlating a new work order according to claim 9, wherein the step of grouping the new work order information comprises grouping the new work order information with existing work order information that shares at least one of a common designation of a telephone system central office facility, a common designation of a telephone system cable, a common designation of a telephone system cross-connect, a common designation of a utility pole, a common designation of a telephone system terminal, a common designation of a telephone system line pair, and a common designation of telephone system terminal equipment.

12. A process of correlating a new work order according to claim 9, wherein the step of grouping the new work order information comprises grouping the new work order information with existing work order information that shares at least one of a common telephone system installation status, a common telephone system route, a common telephone system verification code, a common telephone system remote terminal address, a common telephone system cable range, and a common telephone system line pair range.

13. A process of correlating a new work order according to claim 9, wherein the step of grouping the new work order information comprises grouping the new work order information with existing work order information that shares at least one of a common telephone system exchange key, a common telephone system office equipment range, and a common telephone system facility number.

14. A process of correlating a new work order according to claim 9, wherein the step of grouping the new work order information comprises grouping the new work order information with existing work order information that shares at least one of a common digital loop carrier equipment failure, a common fiber optic equipment failure, a common pair gain equipment failure, and a common digital subscriber line equipment failure.

15. A process of correlating a new work order according to claim 9, further comprising creating a group work order, the group work order describing all work order information that share the same correlation parameter, the common telephone system wire center, and a date and time stamp within the predetermined interval.

16. A process of correlating a new work order with existing work orders, the process comprising the steps of:
　a) communicating with a communications network and inquiring whether the new work order contains at least one correlation parameter;
　b) communicating with the communications network and inquiring whether existing work orders also contain the at least one correlation parameter;
　c) communicating with the communications network and requesting that the new work order be grouped with an existing work order that shares the at least one correlation parameter, that shares a common designation of a telephone system wire center, and that has a date and time stamp within a predetermined interval of a date and time stamp of the new work order,
　d) assigning the grouped new work order and existing work order to a single technician;
　whereby the process correlates the new work order with an existing work order having the at least one correlation parameter, the same wire center, and similar date and time stamps.

17. A process of correlating a new work order according to claim 16, wherein the step of communicating with the communications network and requesting that the new work order be grouped with an existing work order comprises requesting that the new work order be grouped with an existing work that shares at least one of a common telephone system trouble code, a common telephone system central office failure, and a common telephone system cable failure.

18. A process of correlating a new work order according to claim 16, wherein the step of communicating with the communications network and requesting that the new work order be grouped with an existing work order comprises requesting that the new work order be grouped with an existing work that shares at least one of a common designation of a telephone system central office facility, a common designation of a telephone system cable, a common designation of a telephone system cross-connect, a common designation of a utility pole, a common designation of a telephone system terminal, a common designation of a telephone system line pair, and a common designation of telephone system terminal equipment.

19. A process of correlating a new work order according to claim 16, wherein the step of communicating with the communications network and requesting that the new work order be grouped with an existing work order comprises requesting that the new work order be grouped with an existing work that shares at least one of a common telephone system installation status, a common telephone system route, a common telephone system verification code, a common telephone system remote terminal address, a common telephone system remote terminal address and system identification, a common telephone system cable range, and a common telephone system line pair range.

20. A process of correlating a new work order according to claim 16, wherein the step of communicating with the communications network and requesting that the new work order be grouped with an existing work order comprises requesting that the new work order be grouped with an existing work that shares at least one of a common telephone system exchange key, a common telephone system office equipment range, and a common telephone system facility number.

21. A process of correlating a new work order with existing work orders, the process comprising the steps of:
　a) communicating with a communications network and acquiring new work order information, the new work order information representing the new work order, the new work order information having a date and time stamp;
　b) searching the new work order information for at least one correlation parameter;
　c) searching a database of existing work orders for the at least one correlation parameter; and
　d) grouping the new work order information with existing work order information that shares the at least one correlation parameter, that shares a common designation of a telephone system wire center, and that has a date and time stamp within a predetermined interval of a date and time stamp of the new work order,
　e) assigning the grouped new work order and existing work order to a single technician;
　whereby the process correlates the new work order with an existing work order having the at least one correlation parameter, the same wire center, and similar date and time stamps.

22. A process of correlating a new work order according to claim 21, wherein the step of grouping the new work order information comprises grouping the new work order information with existing work order information that shares at least one of a common telephone system central office failure, and a common telephone system cable failure.

23. A process of correlating a new work order according to claim 21, wherein the step of grouping the new work order information comprises grouping the new work order information with existing work order information that shares at least one of a common designation of a telephone system central office facility, and a common designation of a telephone system cable, a common designation of a telephone system cross-connect, a common designation of a utility pole, a common designation of a telephone system terminal, a common designation of a telephone system line pair, and a common designation of telephone system terminal equipment.

24. A process of correlating a new work order according to claim 21, wherein the step of grouping the new work order information comprises grouping the new work order information with existing work order information that shares at least one of a common telephone system installation status, a common telephone system route, a common telephone system verification code, a common telephone system remote terminal address, a common telephone system remote terminal address and system identification, a common telephone system cable range, and a common telephone system line pair range.

25. A process of correlating a new work order according to claim 21, wherein the step of grouping the new work order information comprises grouping the new work order information with existing work order information that shares at least one of a common telephone system exchange key, a common telephone system office equipment range, and a common telephone system facility number.

26. A process of correlating a new work order according to claim 21, wherein the step of grouping the new work order information comprises grouping the new work order information with existing work order information that shares at least one of a common digital loop carrier equipment failure, a common fiber optic equipment failure, a common pair gain equipment failure, and a common digital subscriber line equipment failure.

27. A system for correlating work orders, comprising:
a Correlation Manager module correlating new work order information with existing work order information, the Correlation Manager grouping the new work order information with existing work order information that shares at least one correlation parameter, that shares a common designation of a telephone system wire center, and that has a date and time stamp within a predetermined interval of a date and time stamp of the new work order information; and
a processor capable of processing the new work order information, capable of processing the existing work order information, and capable of grouping the new work order information with the existing work order information and capable of assigning the grouped new work order and existing work order to a single technician.

28. A computer program product for correlating work orders, comprising:
a computer-readable medium; and
a Correlation Manager module stored on the medium, the Correlation Manager module correlating new work order information with existing work order information, the Correlation Manager grouping the new work order information with existing work order information that shares at least one correlation parameter, that shares a common designation of a telephone system wire center, and that has a date and time stamp within a predetermined interval of a date and time stamp of the new work order information, the Correlation Manager assigning the grouped new work order and existing work order to a single technician.

* * * * *